United States Patent [19]
Desjardins

[11] Patent Number: 4,857,185
[45] Date of Patent: Aug. 15, 1989

[54] AERATED FACULTATIVE BASIN HAVING A DUAL FUNCTION AERATION AND SLUDGE REMOVAL PUMP IN ADJACENT WELL

[76] Inventor: Gaétan Desjardins, 8170 Yves Prévost, Anjou, Quebec, Canada

[21] Appl. No.: 170,742

[22] Filed: Mar. 21, 1988

[30] Foreign Application Priority Data

Apr. 13, 1987 [GB] United Kingdom ............... 8708844

[51] Int. Cl.$^4$ ............................................. B01D 21/00
[52] U.S. Cl. ................................. 210/150; 210/170; 210/195.3; 210/197; 210/220
[58] Field of Search ............ 210/194, 195.3, 197, 210/199, 220, 620, 629, 621, 625, 626, 170, 258, 150, 151

[56] References Cited

U.S. PATENT DOCUMENTS

| | | | |
|---|---|---|---|
| 3,840,457 | 10/1974 | Wilson | 210/629 |
| 3,926,808 | 12/1975 | Goddard | 210/220 |
| 3,957,633 | 5/1976 | Gatti et al. | 210/194 |
| 3,997,437 | 12/1976 | Prince et al. | 210/220 |
| 4,002,561 | 1/1977 | Traverse | 210/220 |
| 4,231,874 | 11/1980 | Heiligtag | 210/220 |
| 4,618,426 | 10/1986 | Mandt | 210/629 |

FOREIGN PATENT DOCUMENTS 3438571 4/1986 Fed. Rep. of Germany ...... 210/620

Primary Examiner—Richard V. Fisher
Assistant Examiner—Cynthia L. Nessler
Attorney, Agent, or Firm—Steele, Gould & Fried

[57] ABSTRACT

A waste water and sewage treatment system for use in a facultative aeration-sedimentation basin or lagoon includes a submerged water pump mounted in a well in water communication with the basin. This pump supplies water under pressure to a water header on which a plurality of water jets are mounted in such a manner as to create the forced water circulation inside the basin. Each water jet incorporates an air-sucking venturi to oxygenate the waste water or sewage. Valves are provided in the well for disconnecting the water pump from the water header and then connecting it to a sludge collecting duct extending from the well over a given distance into the basin in such a manner as to drain off the accumulated sludge at the bottom of the basin through the sludge collecting duct and drain-out through a sludge disposal pipe. The system is particularly interesting in that it makes use of the same pump to aerate the waste water or sewage and drain-off the accumulated sludge.

9 Claims, 6 Drawing Sheets

AERATED FACULTATIVE BASIN HAVING A DUAL FUNCTION AERATION AND SLUDGE REMOVAL PUMP IN ADJACENT WELL

BACKGROUND OF THE INVENTION (a) Field of the invention

The present invention relates to a waste water and sewage treatment system for use in an aeration-sedimentation basin or lagoon.

(b) Brief description of the prior art

A conventional method of treating industrial or municipal waste water and/or sewage consists in subjecting them to an aerobic digestion into one or more basins or lagoons. For the purpose of simplifying the following description, only the word "basins" will be used hereinafter to identify both the basins and lagoons.

To achieve such an aerobic digestion, the waste water or sewage is subjected in the basin to an aeration treatment that is usually carried out by mere injection of oxygen or air into the waste water. Such an injection can be carried by means of jets-aspirators each consisting of a water jet incorporating an air sucking venturi making it capable to draw in atmospheric air and blow it into the waste water or sewage to be treated.

From time to time, it is of course compulsory to remove the sludge which settles and accumulates at the bottom of the basin. To do so, it is of common practice to scrap the bottom of the basin with a drag line or with a bulldozer. In the latter case, the basin must of course be emptied. In both cases any way, the sludge removal is time consuming and very expensive operation.

MAIN OBJECTS OF THE INVENTION

A first object of the present invention is to provide a waste water and sewage treatment system for use in a standard aeration-sedimentation basin or lagoon, which system incorporates unique means for collecting and removing settled sludge at the bottom of the basin without any requirement to empty the same and/or to use heavy equipment.

Another object of the invention is also to provide a waste water and sewage treatment system which is very simple in construction as compared to the existing systems in that it makes use of a single pump both to provide aeration of the waste water and to perform sludge removal whenever necessary.

A further object of the present invention is also to provide a waste water and sewage treatment system whose general operating conditions are substantially improved as compared to any existing system used for operating a standard aerated lagoon or basin.

SUMMARY OF THE INVENTION

In accordance with the invention, these objects are achieved as follows.

First of all, each basin is provided with one or more aerating means for oxygenating the waste water or sewage contained in the basin. Each of these aerating means consists of a water header extending into the basin, on which are mounted a plurality of jets incorporating an airsucking venturi making it capable of drawing-in atmospheric air and injecting it into the waste water. Each basin is also provided with at least one sludge collecting duct for collecting the settled sludge at the bottom of the same.

The water header and sludge collecting duct are both connectable via a set of valves to a single submerged water pump located inside a well constructed near or adjacent the basin. The valves are preferably located in the well which thus may act as a "pumping and control chamber".

These valves may be operated in such a way as to supply pressurized water drawn from the basin to the water header to activate the water jets or, alternatively, to connect the sludge connecting duct to the inlet of the pump in such a manner as to drain-off at least part of the sludge settled at the bottom of the basin and drain it out through a sludge disposal pipe.

Advantageously, the water jets are fixed onto the water header in such a way as to force an internal circulation of the waste water content and to allow accumulation of the settled sludge close to the sludge collecting duct which may be mounted with the water header onto a common support acting as a barrier in the basin for the circulating sludge.

More particularly, the waste water sewage treatment system according to the invention as broadly claimed hereinafter, basically comprises:

a well constructed near or adjacent the facultative aeration-sedimentation basin;

water connection means that may consist of a pipe or a mere opening, to allow water from the basin to enter the well;

a submerged water pump mounted in the well, said pump having an inlet and an outlet;

a water header extending from the well over a given distance into the basin at least one aerating means mounted onto the water header for oxygenating the waste water or sewage in the basin, each of said aerating means consisting of a water jet connected to said header and incorporating an air-sucking venturi, each of said water jets being positioned onto the header in such a manner as to create a forced water circulation;

a sludge collecting duct extending from the well over a given distance into the basin, said sludge collecting duct having a plurality of sludge collecting openings located at the vicinity of the bottom of the basin;

a sludge disposal pipe extending from the well to drain the sludge out of said well; and interconnection means located in the well, said interconnection means including means for selectively opening the water connection means and simultaneously connecting the pump outlet to the water header to allow water to enter the well and be sucked up through the pump inlet and their supplied under pressure to the header in order to activate the water jets and cause aeration and circulation of the water in the basin, and means for selectively opening the sludge collecting duct in the well while the water connection means is closed, and the pump outlet to the sludge disposal pipe to allow at least part of the sludge settled at the bottom of the basin to be sucked in the well out of said basin and pumped out of said well whenever desired.

In accordance with a preferred embodiment of the invention, the system may also include means for selectively opening the water connection means and connecting the pump outlet to the sludge collecting duct in order to proceed to a back-wash of this sludge collecting duct whenever required, and means for selectively opening the water header in the well and connecting the pump outlet to the sludge disposal pipe or to the water connection means in order to proceed to a back-wash of the water jets, whenever necessary.

With such interconnection means, the waste water and sewage treatment system according to the invention can perform the following operations:

(1) it may be used to aerate the waste water and sewage, using the water jets to do so;

(2) it may be used to remove the settled sludge from the bottom of the basin;

(3) it may also allow countercurrent back-wash of the jets whenever necessary; and (4) it may further allow countercurrent back-wash of the sludge collecting duct whenever necessary.

When the water header and sludge connecting duct form together a barrier for the circulating sludge, a bypass pass pipe may be provided between the well and the basin downstream the barrier. In such the case, the interconnection means may further include means for opening the sludge collecting duct in the well and connecting the pump outlet to the bypass pipe to allow recirculation of the sludge over the barrier and/or sludge reaeration using the water jets to do so.

It is worth mentioning that all of these operations are performed with one single pump only, without having to dismount any equipment.

BRIEF DESCRIPTION OF THE DRAWINGS

The invention, its objects and its numerous advantages will be better understood upon reading of the following non restrictive description of a preferred embodiment thereof, given with reference to the accompanying drawings wherein.

DESCRIPTION OF A PREFERRED EMBODIMENT OF THE INVENTION

Figure 1:
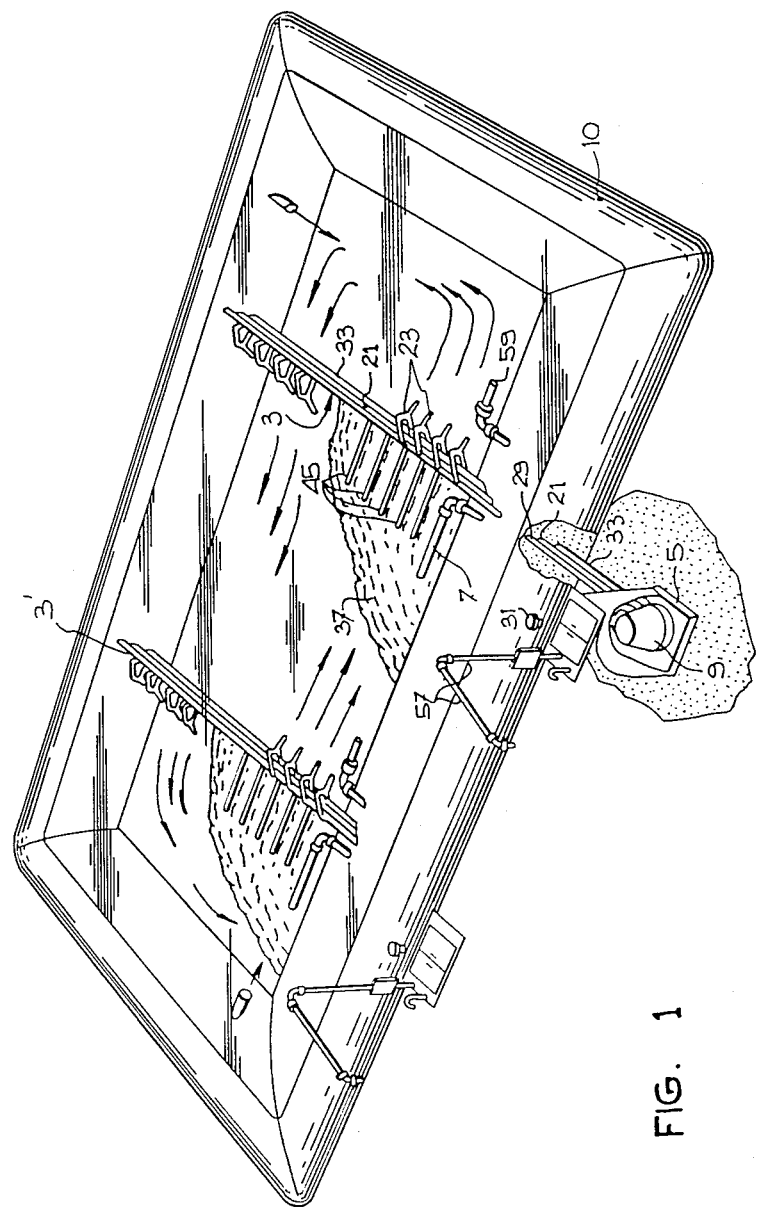
FIG. 1 is a perspective view of a basin provided with a waste water and sewage treatment system according to the invention.

The waste water and sewage treatment system according to the invention as shown in FIG. 1 is used in a conventional waste water epuration system making use of a conventional aeration-sedimentation basin or lagoon 1 provided with inclined or straight vertical walls all around its periphery.

The waste water and sewage treatment systems according to the invention are generally identified by reference numerals 3 and 3'. They are, positioned in the basins in such a manner as to work in unison as will be explained hereinafter. As both systems 3 and 3' are identical, in structure, only one of them will be disclosed in greater detail hereinafter.

Figure 2:
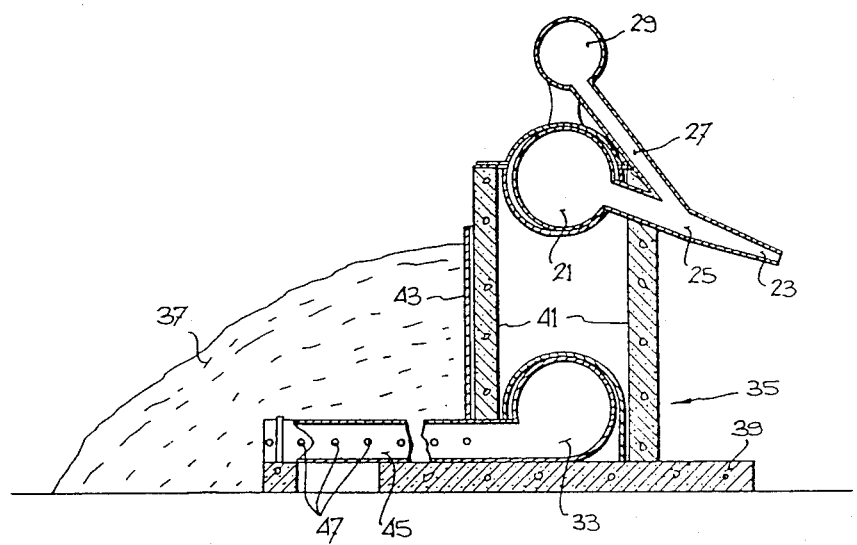
FIG. 2 is a cross-sectional, side elevational view of the water header and sludge removal duct support assembly used as a barrier in the basin.
Figure 5:
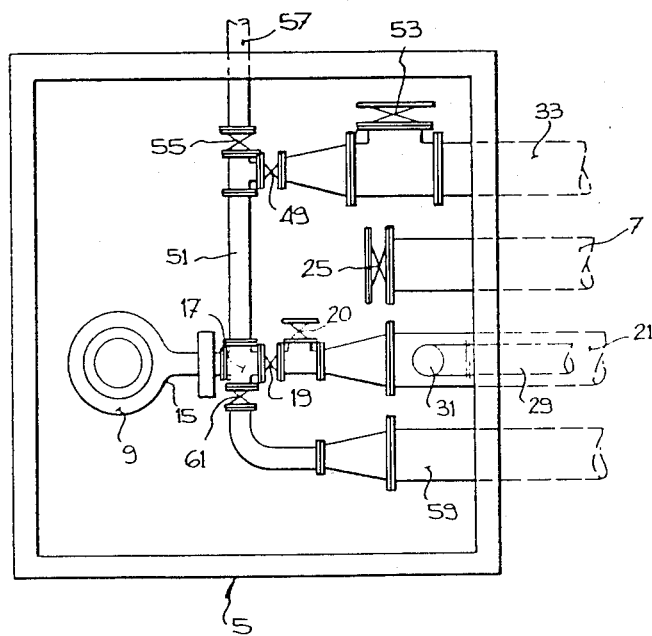
FIG. 5 is a diagrammatic top plan view of the well containing the submerged water pump and valve assembly.
Figure 6:
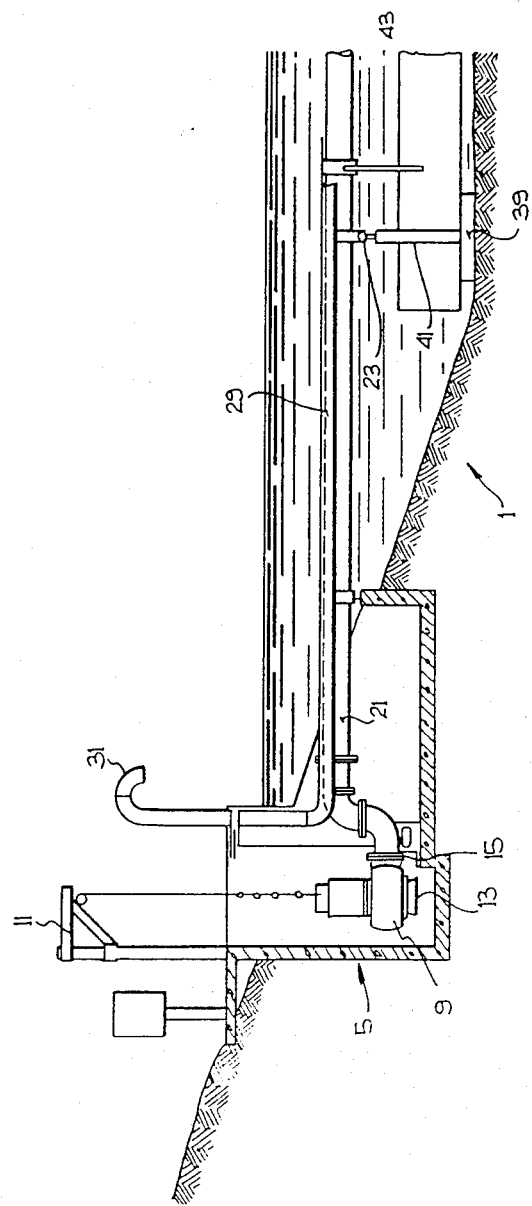
FIG. 6 is a side elevational view of the well shown in FIG. 5, with the adjacent portion of the basin.
Figure 7:
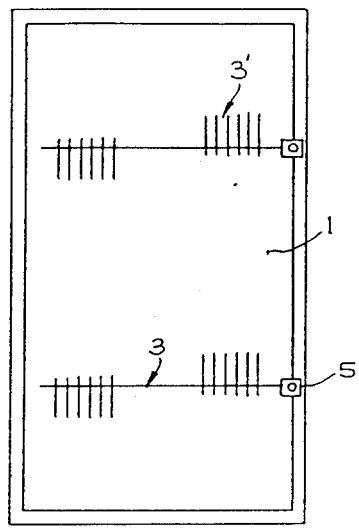
FIG. 7 is a diagrammatic top plan view of a half station installation system incorporated into a basin.

As better shown in FIG. 2, 5 and 6, the treatment system 3 comprises a pumping station including a well 5 located near or adjacent the basin 1. The well 5 is deep enough to extend well under the average water level in the basin 1 and is in water communication with this basin by means of water connection means that way consist of a pipe 7 that is positioned in such a manner as to open in the basin just under the water level. The end of the water pipe 7 which is in the well 5 is provided with a valve 25 that may be opened and closed as will be explained hereinafter. When the valve 25 is opened, water is free to flow from the basin into the well 5 to fill up the same. Intercommunication between the well 5 and basin 1 may be simplified by means of an opening provided trough the wall of the well if this well is located in the basin itself or adjacent the same.

A submerged water pump 9 is mounted in the well 5. The pump 9 which may be hung onto a jib 11 (see FIG. 6) comprises a water inlet 13 extending close the bottom of the well 5, and a water outlet 15 which may be connected, via a four-opening connector 17, a valve 19, and a T-shaped connector whole lateral opening may be opened or closed by a valve 20, to a water header 21 which extends out from the well over substantially the full width of the basin (see FIG. 1).

The plurality of aerating means are mounted onto the water header 21 for oxygenating the waste water or sewage contained in the basin 1. Each aerating means consists of a water jet 23 of any conventional structure, connected to the water header 21. Each water jet 23 incorporates an air sucking venturi 25 connected via an air supply pipe 27 to a main air duct 29 which extends parallel to the water header 21 along the same. This main air duct 29 is advantageously provided with a single air intake pipe 31 (see FIGS. 5 and 6) protruding out of the ground preferably inside the well 5 so as to be easily accessible. If desired, a low pressure blower (not shown) can be incorporated into the air intake to provide a surplus of oxygenation whenever required.

The water jets 23 are mounted and positioned onto the water header 21 in such a manner as to create a forced water circulation causing a simultaneous sludge circulation inside the basin 1. When use is made of two systems 3 and 3' as shown in FIG. 1, the jets 23 are advantageously positioned in such a manner as to create a single continuous circulation over the entire surface area of the basin 1 as shown with arrows in FIG. 1.

As better shown in FIG. 2, the jets 23 are positioned at an optimum angle to develop maximum oxygen transfer using the kinetic energy of the pressurized water supplied by the header 21, and also to efficiently transfer The system 3 according to the invention further comprises a sludge collecting duct 33 extending from the well over a given distance into the basin 1, preferably across the same, under the water header 21.

As better shown in FIG. 2, the water header 21, the air duct 29, the sludge collecting duct 33 and the water jets 23 are preferably mounted onto a common support 35 laying onto the bottom of the basin and acting therein as a barrier for the circulating sludge 37. This support 35 may comprise a concrete base 39 from which vertically extend a plurality of columns 41 that can also be made of concrete The sludge collecting duct 33 is preferably positioned at the bottom of the support 35 while the water header 21 and air duct 29 are positioned on top thereof. To positively stop the sludge circulation and cause sludge accumulation upstream the support, partitions 43 can be fixed to some of the columns 41, to form a dam against which the sludge 37 may accumulate. Alternatively, some of the columns 41 can be constructed to form all together a solid wall barrier, shown in FIG. 3.

In any case, the support 35 may be of a monolytic modular construction or it may be cast in situ between existing jet aerator modules. Whatever be its structure, the support 35 acts as a barrier for the sludge and causes the same to accumulate and settle just upstream of the sludge collecting duct 33, thereby increasing the efficiency of the whole system by increasing the available sludge accumulation volume.

Figure 3:
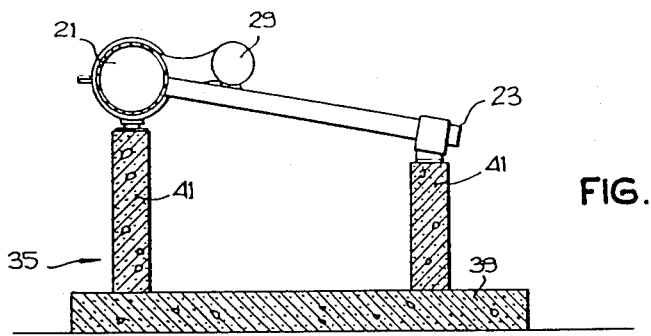
FIG. 3 is a cross-sectional, side elevational view similar to the one of FIG. 2, showing another header and duct assembly forming a wall barrier.
Figure 4:
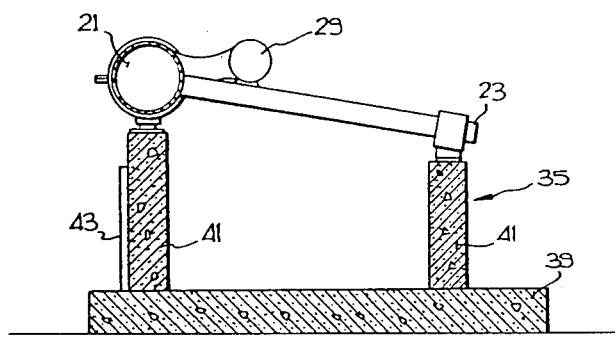
FIG. 4 is another view similar to the one of FIG. 2 showing a further header and duct assembly forming a partition barrier.

Two other examples of support structure 35 are shown, by way of example, in FIG. 3 and 4. The structural elements shown in both of these figures have been identified with the same reference numerals as above, for the purpose of simplicity.

A plurality of blind sludge-collecting pipes 45 extend perpendicularly from the sludge collecting duct 33 at given interval, upstream of the concrete wall 41 or partitions 43. Each sludge collecting pipe is provided with a plurality of openings 47 which are positioned at the vicinity of the bottom, of the basin where the sludge 37 has accumulated, upstream of the barrier defined by the partitions 43.

The open end of the sludge collecting duct 33 inside the well 5 is connected to one of the lateral opening of the four-way connector 17 located at the outlet 15 of the pump 9, by means of a valve 49 opening into a connection pipe 51. The end of the duct 33 is provided, upstream of the valve 49, with a large lateral opening leading to the well, which lateral opening may be opened or closed by a valve 53.

The free end of the pipe 51 opposite to the connector 17 is connected, via a valve 55, to a sludge disposal pipe 57 extending out of the well.

The system 3 as shown in the accompanying drawings further comprises a by-pass pipe 59 connected via a valve 61 to the remaining fourth opening of the four-way connector 17. The by-pass pipe 59 extends out of the well 5 into the basin downstream of the support 35, as shown in FIG. 1.

All of the valves 19, 20, 25, 49, 53, 5 and 61 are locate inside the well 5 and are therefore readily accessible for maintenance purpose. In practice, they are opened and closed as follow.

To proceed to an aeration of the waste in the basin 1, the valve 25 at the end of the water pipe 7 and the valve 19 at the inlet of the water header 21 are opened and all the other valves are closed. As can be seen, activation of the pump causes the water usually clearer on top of the basin to enter the well 5 via the pipe 7 and valve 25 and then to be pumped from this well through the inlet of the pump 9 to be supplied under pressure through the valve 19 into the water header 21 and, therefrom, into the water jets 23 to activate the same.

The propulsion of the jets 23 is applied towards the water in the basin. As clearly shown in the drawings, the jets 23 are slightly inclined toward the bottom of the basin 1 so as to maximize the oxygen transfer effect as well as to gently assist the solids to go in the desired direction shown with arrows in FIG. 1. As a result, the solids are carried by natural and lateral movement of the waste water developed by the action of the jets 23 which are so oriented as to allow settling of the solids in front of the barriers formed by the various ducts and pipes and or their supports 35. As a result of this motion imparted by the jets 23, a concentrate sludge 37 builds up in front of the supports 35, directly onto the perforated sludge collecting pipes 45 connected to the sludge collecting ducts 33.

Periodically and for a limited period of time, it is necessary to remove the accumulated sludge 37. To proceed to such a sludge removal, the lateral valve 53 at the end of the sludge collecting duct 33 is opened, together with the valve 55. All the other valves are closed and the pump is activated. This causes the accumulated sludge to be sucked in the sludge collecting duct 33 through the openings 47 in the pipes 45 and drawn into the well 5 where it is pumped in through the pump inlet and pumped out through the pump outlet and the sludge disposal pipe 57.

As solids are expected to be rather dense (2-4% normally), a few days only may be necessary to allow reaccumulation of sludge at the same location after a draw off operation.

Figure 8:
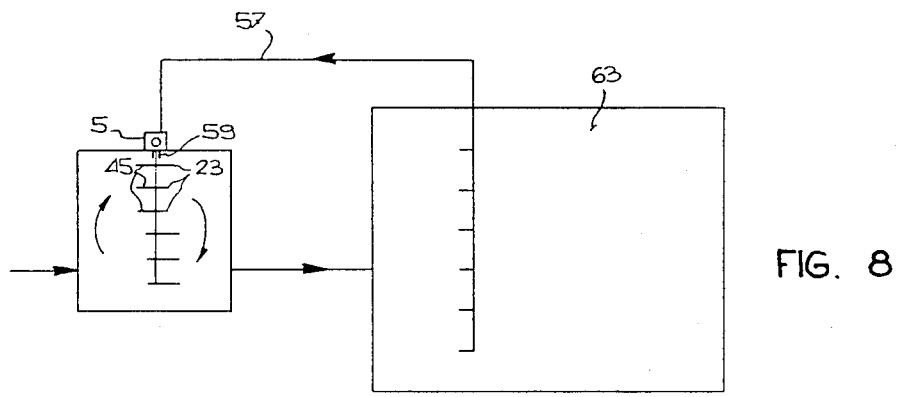
FIG. 8 is a diagrammatic top plan view of a waste water treatment system making use of an aeration basin and an adjacent settling lagoon.

The extracted sludge can be handled in a variety of ways. By way of example, the sludge may be transferred into a sludge holding lagoon 63 built adjacent to the aeration basin 1 as shown in FIG. 8. The sludge may also be transported with dump trucks to a landfill or to a remote sludge treatment station. The extracted sludge may further be dewatered or spread onto a drying bed.

The extracted sludge will normally be highly anaerobic and malodorous. Accordingly, it is of interest to provide means to by-pass the aeration basin 1 for a certain period of time prior to sludge draw off and then to proceed again with aeration of the sludge through the jet aeration system in order to minimize these effects.

With the waste water treatment system according to the invention, it is also possible to by-pass the sludge barrier 35 whenever necessary. To do so, the lateral valve 53 at the end of the sludge collecting pipe 33 and the valve 61 at the end of the by-pass pipe 59 are both opened. All the other valves are closed and the pump is activated causes the sludge 37 to be drawn in the well by the pump 9 and be returned into the basin downsteam the support 35 through the by-pass pipe 59.

Whenever desired, the sludge that is drawn in the well, may also be supplied under pressure to the water header 21 for injection downstream of the barrier through the jets 23. Such a sludge injection through the jets 23 leads to a very efficient sludge aeration, whenever required.

To proceed to a countercurrent back-wash of the jets from time to time, the lateral valve 20 at the inlet of the water header 21 and the valve 61 are opened. Activation of the pump causes water to be drawn in the well through the jets 23 and water header 21 via the valve 20, and then to be expulsed by the pumps out of the well through the by-pass pipe 59.

To proceed to a countercurrent back-wash of the sludge collecting duct 33 and pipes 45, the valve 25 at the end of the water pipe 7 and the valve 49 are opened. All the other valves are closed and the pump is activated to draw in fresh water from the basin 1 and supply it under pressure through the four-opening connection 17, pipe 51 and valve 49, to the sludge connecting duct 33.

The system according o the invention as disclosed hereinabove is particularly interesting in that it provides a permanent and practical solution to the removal disposal of sludge from an aerated basin or lagoon. Due to its particular structure, heat recovery is achieved from all motorized injected power into the process water. A uniform distribution of the organic and hydraulic leads is also achieved in each basin, thereby avoiding local odorous surcharges and internal short circuiting. No building or blowers are required as the system, because of its construction, is completely frost proof. Moreover, all the mechanical equipment, i.e. the pump 9 and all the valves located in the well 5, are readily accessible for maintenance purpose.

The waste water and sewage treatment system 33 according to the invention allows quick draw-off of the accumulated sludge at the bottom of the bassin 1. This operation advantageously causes pulsations in the sludge and allows efficient and concentrated sludges recuperation. Thus, freshly drawn off sludge can be stored in the morning in a reservoir and be dewatered later in the same day. This can of course be continued from day to day without any need to drain or by-pass the basin or lagoon and without creating an other major problem for a long period of time.

Figure 9:
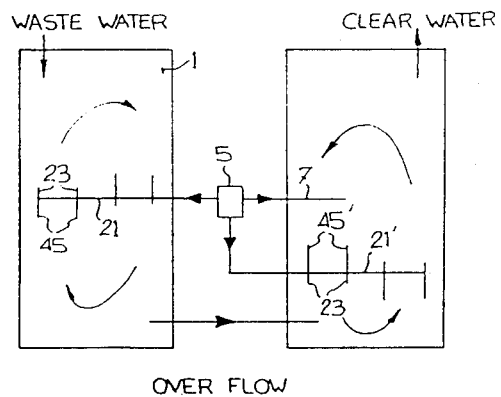
FIG. 9 is a diagrammatic top plan view of a waste water treatment system making use of two successive basins.

Of course, the waste water and sewage treatment system according to the invention is not restricted in any way to the very specific structure disclosed hereinabove. Thus, by way of example, the system can be used in combination with two or more basins mounted in line as shown in FIG. 9. In such a case, the well 5 may be mounted, for example, between two adjacent basins 1 and 1' and the system may be designed in such a manner that it comprises one single water pipe 7 connected to the downstream basin 1' where the water is clearer, and two water headers 21 and 21' mounted in the adjacent basin 1 and 1' respectively, to circulate water and sludge therein.

It is therefore obvious that the treatment system disclosed hereinabove can be incorporated and/or combined into any existing waste water treatment lagoon or basin, to provide sludge circulation, aerobic digesting of said sludge and sludge transport inside and outside the basin. The system is particularly interesting in that it may be installed into an existing aeration equipment to draw off the accumulated sludge at the bottom of the aeration basin, thereby making it unnecessary to use heavy machinery to scrap the so accumulated sludge.

The waste water treatment according to the invention has numerous advantages.

First of all, it provides requested aeration of the waste water and thus allows aerobic digestion of the same to reduce organic pollution.

Secondly, it provides mixing of the waste water inside the basin in such a way as to induce an interior circulation of this waste water. The advantage of such a forced circulation are as follows:

(1) Any organic surcharge at the lagoon inlet or elsewhere is dispersed rapidly and evenly in all the lagoon thereby avoiding malodorous conditions at springtime particularly or at any other time of the year. Each cell of the water treatment unit is then working uniformly.

(2) Large quantity of sludge is forced to settle in certain locations of the aeration basin due to induced water circulation and the natural gravity sludge flow pattern at the bottom. Such a sludge flow pattern is intercepted by each transversal barrier formed by the water header arrangement and its support with on without vertical partitions, which barrier can be held in place transversely or longitudinally in the bassin.

(3) The system allows distribution of the raw waste water from the inlet of each basin rapidly to the entire basin using the pump suction of one module of the aeration system to draw all or a large portion of the waste water and disperse it directly and rapidly through the aerating jets into the water current toward the entire basin.

(4) The velocity of the waste water is adjustable inside the lagoon by simply replacing the nozzle tips of the jets 23 by others.

(5) Recirculation of cleaner water is allowed from the second or further basin to assist the oxygen level in the headwork basin through the jet pumps (as shown in FIG. 9).

Thirdly, the waste water and sewage treatment system according to the invention provides a positive way of removing a large quantity of accumulated sludge using the aeration equipment in place. Massive quantity of sludge is forced to settle in certain spots of the basin because of the jet circulation and the bottom transversal barrier formed by the main piping header assembly including aeration header, the sludge collecting duct and the air supply duct.

Under certain circumstances, the sludge collecting duct may be mounted in such a manner as to have portions of it parallel to the longitudinal axis of the basin, i.e. parallel to direction of flow implied by the jet action. In such a case, barriers must of course be provided in other locations or accessories such as baffles must be used to stop the sludge.

As explained hereinabove, the sludge 37 is drawn in the sludge collecting duct 33 via a plurality of perforated pipes 45 connected perpendicularly to a specific section of this duct. This section can be drained back to the main pump station by operating certain valves.

The pump 7 can be operated to pump the sludge out of the basin 1 and well 5 to another location for further treatment, storage, handling or drying. The sludge collecting duct 33 may be directly connected to the pump inlet to draw sludge 52 if gravity force is not sufficent or if the hydraulic conditions or the pump station construction do not permit gravity flow of the sludge to the pump inlet.

The well 5 and its equipment act as a pump station and advantageously gives direct and easy access to all mechanical equipments. It is worth mentioning that such a well 5 could however be omitted and the pump directly installed inside the basin 1 for construction cost saving. Location of the pump can be at the end of water header and sludge collecting duct, or in the middle thereof. In the latter case, pump suction would require piping and necessary valving to perform the same duties.

Other different arrangement can be made using a dry pit pump provided with self priming. In such a case, the well 5 may be in the form of a standard wall construction or in the form of a half station construction with opened inclined walls as shown in FIG. 9, both allowing easy direct access from the ground level. If no well is provided or the well is built in the basin away from the shore, an access bridge or any other similar device must of course be provided to permit maintenance servicing.

Figure 10:
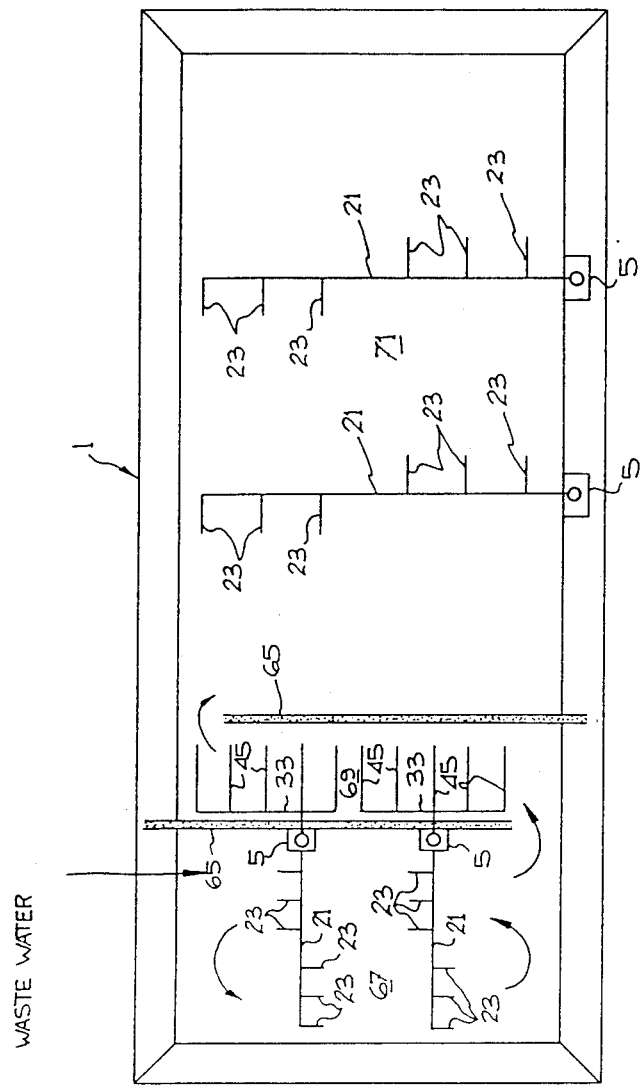
FIG. 10 is a diagrammatic top plan view of an activated cell inside a basin incorporating sludge recirculation from a sedimentation zone via sludge pipes connected to the pump which is recirculating the sludge in the activated cell via a jets aeration equipment.

Another possible arrangement is shown in FIG. 10. In this particular arrangement, the basin 1 is divided by means of walls 65 into a pathway forming an activated cell 67 where at least one jet aeration assembly 5, 21, 23 is provided; a sedimentation zone 69 where at least one sludge removal assembly 5, 33, 45 is provided; and a further "standard" cell 71 also provided with at least one jet aeration assembly 5, 21, 23.

The waste water treatment system according to the invention further allows aeration of the accumulated sludge and recirculation of it within the basin using the same equipment as described above. Such a particular treatment may be obtained by operating other valves. Then the sludge is drawn toward the pump and discharged back into the basin through the aeration jets using the equipment.

Therefore, the waste water treatment system according to the invention allows:

(a) direct access to all the mechanical equipment such as pumps, valves, etc., (b) large solids handling capacity through the pumps, piping and jets (25 to 76 mm diameter); and (c) back-wash of the jets using countercurrent.

The latter operation can be done by gravity forces or as explained hereinabove by connecting the pump suction to the sludge collector duct.

The waste water and sewage treatment system according to the invention is particularly well suited for severe cold winter climates. Indeed, it is designed in such a way that:

(1) no aerator, pipe or other equipment is exposed at the surface of the water in the basin;

(2) circulation of the water in the basin discourages ice formation on the surface of this basin;

(3) mixing is applied to the basin with an horizontal force at approximately mid-depth to dissipate the least possible heat contained in the waste water and to get the best hydraulic velocity profile without moving the sludge too much;

(4) the heat contained in the water is dispersed to the entire basin using forced water circulation so that the temperature is relatively constant all across the basin; and (5) the waste water is heated by the pump which is of the submersible type and is in continuous operation normally. As the detention time of the water in the basin is quite long (typically 1 to 30 days) the quantity of heat provided by the submersible motors of the pumps (typically 2 to 16 motors ranging from 5 to 100 HP) is considerable. All the heat is transferred entirely to the waste water. This will provide higher temperature of the water to keep it from freezing in winter and also assist the treatment process for better performances, the process thus becoming highly energy efficient. In fact, all energy injected in the process is usable for mixing, aerating, heating, and providing a better process. The only lost of energy is the slow current velocity at the surface of the basin.

The result of these advantages can be translated into better treatment performances, higher energy conservation, lower operating costs and also taking care of the sludge removal problems in widely spreaded lagoons. This also eliminates all hydraulic short-circuit and local malodorous conditions caused by any type of organic surcharges ahead of the basin or elsewhere.

The embodiments of the invention in which an exclusive property or privilege is claimed are defined as follows:

1. A waste water and sewage treatment system for use in a facultative aeration-sedimentation basin, said system comprising:

a well constructed near or adjacent the facultative aeration-sedimentation basin;

water connection means to allow water from the basin to enter the well;

a submerged water pump mounted in the well, said pump having an inlet and an outlet;

a water header extending from the well over a given distance into the basin;

at least one aerating means mounted onto the water header for oxygenating the waste water or sewage in the basin, each of said aerating means consisting of a water jet connected to said header and incorporating an air-sucking venturi, each of said water jets being positioned onto the header in such a manner as to create a forced water circulation inside the basin;

a sludge collecting duct extending from the well over a given distance into the basin, said sludge collecting duct having a plurality of sludge collecting openings located at the vicinity of the bottom of the basin;

a sludge disposal pipe extending from the well to drain the sludge out of said well; and interconnection means located in the well, said valve interconnection means including means for selectively opening the water connection means and simultaneously connecting the pump outlet to the water header to allow water to enter the well and be pumped through the pump inlet and then be supplied under pressure to the header in order to activate the water jets and cause aeration and circulation of the water in the basin, and means for selectively opening the sludge collecting duct in the well while the water connection means is closed and connecting the pump outlet to the sludge disposal pipe to allow at least part of the sludge settled at the bottom of the basin to be sucked in the well out of said basin and then pumped out of said well whenever desired.

2. The system of claim 1, wherein said interconnection means also includes means for selectively opening the water connection means and connecting the pump outlet to the sludge collecting duct in order to proceed to a back-wash of said sludge collecting duct, and means for selectively opening the water header in the well and connecting the pump outlet to the sludge disposal pipe or to the water connection means in order to proceed to a back-wash of the water jets, whenever necessary.

3. The system of claim 1, further comprising:

an air duct extending parallel to the water header, said air duct having a single air intake; and at least one air supply pipe extending from the air duct to the venturi of each water jet.

4. The system of claim 3, wherein the water header, the air duct, the sludge collecting duct and the water jets are mounted onto a common support laying onto the bottom of the basin and acting therein as a barrier for the circulating sludge.

5. The system of claim 4, wherein:

the water connection means opens into the basin upstream of the barrier;

a by-pass pipe is provided, said by-pass pipe extending between and connecting the well to the basin downstream of the barrier; and the interconnection means further includes means for opening the sludge collecting duct in the well and connecting the pump outlet to the by-pass pipe to allow recirculation of the sludge over the barrier.

6. The system of claim 5, wherein said valve means also includes means for selectively opening the water connection means and connecting the pump outlet to the sludge collecting duct in order to proceed to a back-wash of said sludge collecting pipe and means for selectively opening the water header in the well and connecting the pump outlet to the sludge disposal pipe or to the water connection means in order to proceed to a back-wash of the water jets, whenever necessary.

7. The system of claim 4, wherein the support comprises a base, a plurality of posts for supporting the water header, the air duct, the sludge collecting duct and the water jets, and a plurality of partitions acting together as a dam to stop the sludge, and wherein said sludge collecting openings are formed into a plurality of sludge collecting pipes that are connected to the sludge collecting duct and extend upstream of the base and partitions, where the sludge accumulates.

8. The system of claim 7, wherein:

the water connection means opens into the basin upstream of the barrier;

a by-pass pipe is provided, said by-pass pipe extending between and connecting the well to the basin downstream of the barrier; and the interconnection means further includes means for opening the sludge collecting duct in the well and connecting the pump outlet to the by-pass pipe to allow recirculation of the sludge over the barrier.

9. The system of claim 8, wherein said interconnection means also includes means for selectively opening the water connection means and connecting the pump outlet to the sludge collecting duct in order to proceed to a back-wash of said sludge collecting pipe and means for selectively opening the water header in the well and connecting the pump outlet to the sludge disposal pipe or to the water connection means in order to proceed to a back-wash of the water jets, whenever necessary.

* * * * *